United States Patent [19]
Hessinger

[11] 3,744,317
[45] July 10, 1973

[54] STRAIN GAGE PRESSURE TRANSDUCER
[75] Inventor: William A. Hessinger, North Tonawanda, N.Y.
[73] Assignee: Teledyne, Inc., Los Angeles, Calif.
[22] Filed: Oct. 12, 1971
[21] Appl. No.: 187,979

[52] U.S. Cl. .................. 73/398 AR, 73/406, 338/4
[51] Int. Cl. .............................................. G01l 9/04
[58] Field of Search ............... 73/398 AR, 395, 406; 338/4, 42

[56] References Cited
UNITED STATES PATENTS
2,921,471  1/1960  Weber et al. .................. 73/398 AR
3,662,312  5/1972  Thorp et al. ............................ 338/4

Primary Examiner—Donald O. Woodiel

[57] ABSTRACT

This device operates via a plurality of foil strain gages bonded to the controlled stress zones of a pressure responsive diaphragm or relatively thin wall, the strain gages being connected in a Wheatstone bridge arrangement. As a fluid under pressure is introduced into the fluid medium cavity or channel the pressure is transferred through a thin preferably metal diaphragm to the sensing diaphragm or wall to which is attached the electrical type strain gages which are connected in a Wheatstone bridge circuit which provides an electrical transfer function proportioned to the applied fluid cavity pressure.

4 Claims, 5 Drawing Figures

Patented July 10, 1973 3,744,317
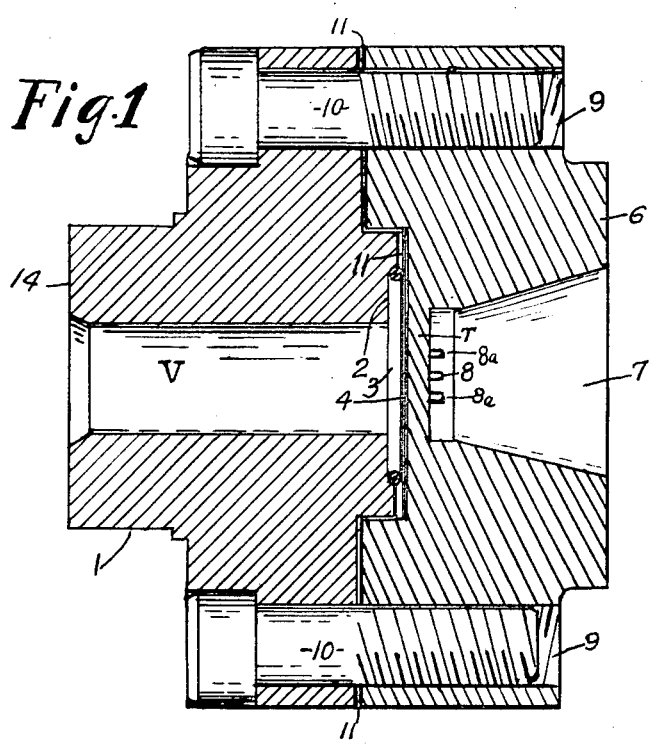
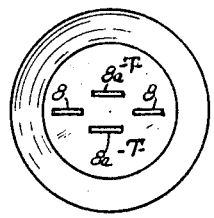
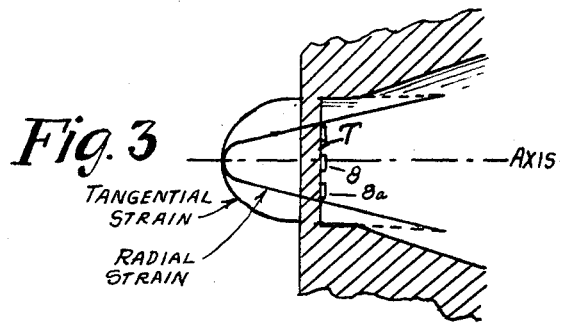
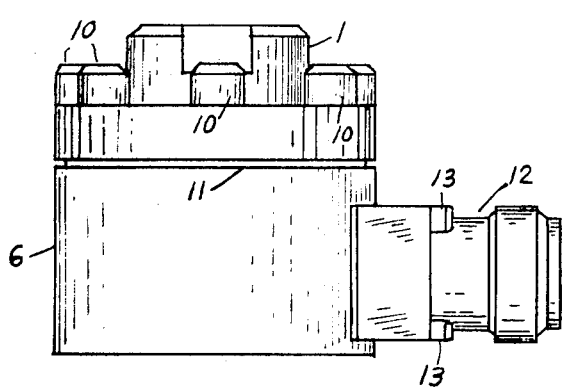
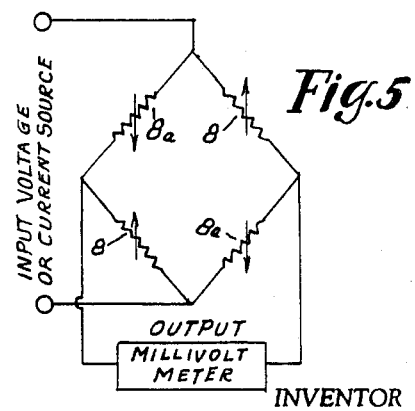
INVENTOR
William A. Hessinger

STRAIN GAGE PRESSURE TRANSDUCER

My invention has the following advantages as compared to prior pressure type strain gages.

1. The fluid pressure cavity or channel may be easily cleaned, the old protection diaphragm and O ring seal being thrown away and new ones inserted without necessitating recalibration.

2. The strain gage calibration components may be easily altered or trimmed by the user in order to suit his instrumentation readout and calibration equipment.

3. The pressure cap, with standard fitting, may generally be made from any material required by the pressure medium corrosive characteristics. The protection diaphragm and O ring or similar seal may also be selected for suitability with respect to the pressure medium.

4. Construction of the sensing diaphragm and cap seal arrangement is such that after cleaning the pressure medium cavity the instrument may be reassembled without disturbing the calibration of the instrument.

An object of this invention is to provide a strain gage instrument capable of responding to a wide range of stresses.

Another object is to provide a device for measuring stress or strain resulting from fluid pressure.

A further object is to provide a relatively simple fluid pressure strain gage instrument which may be easily cleaned.

An additional object is to provide a rugged, safe, strain gage device which can be used with high fluid pressure.

Another object is to provide a fluid pressure strain gage instrument having a novel construction of strain gages mounted on a wall or diaphragm and oriented to be sensitive to both tangential and radial strains. In this application I use the words "strain" and "stress" interchangeably.

Other objects will be evident in the following specification.

IN THE DRAWINGS

FIG. 1 is a part sectional elevation of my fluid pressure type strain gage transducer, the section being made by a plane lying in the axis of the device.

FIG. 2 is a view looking toward the transducer from a position to the right thereof and showing the sensing diaphragm or wall and adjacent flared opening.

FIG. 3 shows an edge view of the sensing wall and strain gage elements and curves of tangential and radial strains.

FIG. 4 is an elevation showing my fluid pressure strain gage transducer with an MS3102-14S-2P electrical fitting attached to the device and projecting to the right. FIGS. 1 and 4 are drawn to different scales.

FIG. 5 shows the electrical circuit including the strain gages.

In FIG. 1 generally cylindrical member or figure of revolution 1 is of the configuration indicated. Annular surface 2 is provided to press firmly against sealing O-ring 3 which is pressed against thin metal or other diaphragm 4 which is forced against sensing diaphragm or wall T when pressure fluid is admitted to chamber V. Diaphragm T is integral with generally cylindrical member 6 which has flared opening 7 through which electrical conductors, not shown, may be connected to foil strain gage elements 8 and 8a bonded to diaphragm T and seen edgewise as in a view looking from left to right in FIG. 2. Elements 8a are for sensing tangential compressive strain of diaphragm T and elements 8 are for sensing radial tensile strain in diaphragm T.

Member 6 has a plurality of equally spaced, axially aligned threaded holes 9 into which threaded bolts 10 are screwed. These bolts may be of socket head type and may be of proper size and number to take the stress from the pressures involved. As a specific example, with an over-all diameter of 2.22 inches I have used ten bolts 0.25 inch in diameter. In FIG. 1, eight bolts are employed. Diaphragms of different thickness or different character can be used for different pressure ranges.

It will be observed that a narrow gap 11 is left between members 1 and 6 after the bolts are tightened, in order to insure that sealing ring 3 is compressed sufficiently to prevent leakage of the high pressure fluid in chamber V.

The curves of FIG. 3 show the variation of tangential and radial strain with respect to radial distance along the diaphragm.

In using the word "bonded" in describing attachment of the strain gage elements to the sensing diaphragm I mean for this to include any method of attachment as by cement, electrical bonding, vacuum deposition, or otherwise. Likewise, it is apparent that it is not essential to attach member 1 to member 6 by means of bolts or screws since these components may be equipped with threads so that one member may be screwed onto the other without separate bolts or screws. In practice, however, it is preferable to use the construction illustrated in FIG. 1.

FIG. 4 shows the assembled device of FIG. 1 with the axis of member 1 swung up 90° from that of FIG. 1 and displayed in reduced scale as compared to FIG. 1. The gap 11 between the members is shown. The member 12 is a standard MS3102-14S-2P fitting for carrying electrical conductors to the bonded strain gage elements. This member is attached to member 6 by means of bolts 13 and similar bolts on the opposite side.

FIG. 4 shows a typical assembled instrument capable of accurately measuring pressures of highly corrosive media whereby bolts 10 may be removed to provide complete access to the cavity area for replacing thin protective diaphragm 4 and seal 3. Electrical bridge calibration components are sealed in enclosure 6 with electrical connections made through electrical receptacle 12. Power supplied to the Wheatstone Bridge can be AC or DC with any suitable millivolt meter, digital volt meter or ratio bridge readout device attached to output terminals. A suitable pipe for fluid pressure supply can be connected to chamber V by means of bolts threaded into holes in annular surface 14 of element 1, by threads around element 1, or in other manner.

FIG. 5 illustrates the circuitry used for the compression strain gages and two tension strain gages. In use the element 1 is suitably connected to a source of fluid pressure after the strain gages are connected in the bridge circuit shown. The result or output is indicated on the millivolt meter after, of course, the input current or voltage is connected to the terminals shown. It will be seen that I have provided a practical strain gage pressure transducer which can be easily dis-assembled for cleaning and the thin stainless steel diaphragm cover and seal can readily be changed while the device is dis-assembled. I have found this to be a very practical device in use.

What I claim:

1. In a strain gage device, a first member adapted to be connected to a source of high pressure fluid and having a channel through said first member, a second member having an integral sensing diaphragm and a plurality of strain gage elements bonded thereto, said sensing diaphragm acting as an end wall of a recess in said second member through which electrical conductors may be connected to said strain gage elements, a relatively thin diaphragm placed against said sensing diaphragm on the opposite face thereof from the face having the bonded strain gage elements, sealing means placed between said relatively thin diaphragm and said first member and surrounding said channel, and means for fastening said first and second members together with said sealing means under compression.

2. The device described in claim 1, said sealing means comprising a compressible ring and said fastening means comprising a plurality of bolts pulling said first and second members toward each other and causing compression of said sealing ring.

3. The device described in claim 1, two of the strain gage elements being in alignment and near the periphery of said sensing diaphragm on opposite sides of the central axis, and the other two strain gage elements being in spaced parallel disposition on opposite sides of said axis.

4. The device as described in claim 1 said relatively thin diaphragm being of larger area than the sensing diaphragm.

* * * * *